United States Patent
Angerer (10) Patent No.: US 10,042,654 B2
(45) Date of Patent: Aug. 7, 2018

(54) COMPUTER-BASED DISTRIBUTION OF LARGE SETS OF REGULAR EXPRESSIONS TO A FIXED NUMBER OF STATE MACHINE ENGINES FOR PRODUCTS AND SERVICES

(71) Applicant: International Business Machines Corporation, Armonk, NY (US)

(72) Inventor: Christoph Angerer, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 541 days.

(21) Appl. No.: 14/300,633

(22) Filed: Jun. 10, 2014

(65) Prior Publication Data

US 2015/0355891 A1    Dec. 10, 2015

(51) Int. Cl.
| | |
|---|---|
| *G06F 17/00* | (2006.01) |
| *G06N 5/04* | (2006.01) |
| *G06F 9/448* | (2018.01) |
| *G06F 9/44* | (2018.01) |
| *H04L 29/06* | (2006.01) |

(52) U.S. Cl.
CPC ............ *G06F 9/4498* (2018.02); *G06F 9/444* (2013.01); *G06F 17/00* (2013.01); *G06N 5/04* (2013.01); *H04L 63/1408* (2013.01)

(58) Field of Classification Search
None
See application file for complete search history.

(56) References Cited

U.S. PATENT DOCUMENTS

| 4,571,678 A | * | 2/1986 | Chaitin | ................... G06F 8/441 |
| | | | | 717/144 |
| 7,962,434 B2 | | 6/2011 | Estan et al. | |
| 8,386,411 B2 | | 2/2013 | Atasu et al. | |

(Continued)

FOREIGN PATENT DOCUMENTS

CN    103166802 A    6/2013

OTHER PUBLICATIONS

George, L. et al., "Iterated Register Coalescing," ACM Trans. on Programming Languages and Systems, vol. 18 No. 3 (1996) pp. 300-324.*

(Continued)

*Primary Examiner* — Kakali Chaki
*Assistant Examiner* — Brian M Smith
(74) *Attorney, Agent, or Firm* — Cantor Colburn LLP; Daniel Morris (57) ABSTRACT

A method for distributing sets of regular expressions to a fixed number of state machine engines includes combining, with a processing device, a plurality of regular expressions into a single compound regular expression, creating a single nondeterministic finite automaton (NFA) including a plurality of NFA states based on the compound regular expression, performing an interference analysis for each pair of NFA states to identify all pairs of NFA states that would potentially interfere in an equivalent deterministic finite automaton (DFA), creating an interference graph representing the regular expressions associated with potentially interfering NFA states based on the results of the interference analysis, and performing a graph coloring algorithm on the interference graph to assign a different color to each represented regular expression in the graph.

4 Claims, 5 Drawing Sheets

(56) References Cited

U.S. PATENT DOCUMENTS

| | | | |
|---|---|---|---|
| 8,386,530 B2 | 2/2013 | McMillen | |
| 9,177,253 B2* | 11/2015 | Ruehle | G06N 5/025 |
| 2011/0258210 A1 | 10/2011 | Agarwal et al. | |
| 2012/0284222 A1 | 11/2012 | Atasu et al. | |
| 2014/0101157 A1* | 4/2014 | Chao | H04L 63/1416 707/737 |

OTHER PUBLICATIONS

Becchi, M. et al., "Extending Finite Automata to Efficiently Match Perl-Compatible Regular Expressions" Proceedings of the 2008 ACM CoNEXT Conference (2008) 12 pp.*

"Register Allocation," Course Notes from the University of Washington, downloaded from the web at <courses.cs.washington.edu/courses/cse501/01wi/slides/slides.02-23.pdf> and verifed available online since Feb. 2001. 10 pp.*

Becchi, Michela et al., "A Hybrid Finite Automaton for Practical Deep Packet Inspection", CoNEXT 2007, Dec. 10-13, 2007, New York, NY, pp. 1-12.

Jiang, Junchen et al., "Pattern-Based DFA for Memory-Efficient and Scalable Multiple Regular Expression Matching", IEEE Communications Society, IEEE ICC 2010 proceedings, 5 pages.

Reetinder Sidhu, et al., "Fast Regular Expression Matching using FPGAs," The 9th Annual IEEE Symposium on Field-Programmable Custom Computing Machines, Mar. 29, 2001, pp. 1-8.

Randy Smith, et al., "XFA: Faster Signature Matching With Extended Automata," IEEE Symposium on Security and Privacy, May 2008, pp. 1-15.

Fang Yu, et al., "Fast and Memory-Efficient Regular Expression Matching for Deep Packet Inspection," ANCS'06; Dec. 3-5, 2006, San Jose, CA, ACM, pp. 1-10.

J. Rohrer, et al., Memory-Efficient Distribution of Regular Expressions for Fast Deep Packet Inspection, CODES—ISSS, ACM, Oct. 2009, pp. 147-154.

Wang, Kai et al., "Towards Fast Regular Expression Matching in Practice", SIGCOMM'13, Aug. 12-16, 2013, Hong Kong China, ACM 978 1-4503-2056-6/13/08, pp. 1-2.

Yang, et al., "Space-Time Tradeoff in Regular Expression Matching with Semi-Deterministic Finite Automata," IEEE INFOCOM, Apr. 2011, pp. 1-9.

* cited by examiner

COMPUTER-BASED DISTRIBUTION OF LARGE SETS OF REGULAR EXPRESSIONS TO A FIXED NUMBER OF STATE MACHINE ENGINES FOR PRODUCTS AND SERVICES

BACKGROUND

The present invention relates generally to processing regular expressions, and more specifically, to distributing large sets of regular expressions to a fixed number of state machine engines, including extended deterministic finite automata engines, in an efficient manner.

A growing number of applications, including virus scanners, intrusion detection, and text analytics, use regular expressions to define patterns that the system must find in input character streams. The regular expressions generally are modeled as one or more finite state machines, including nondeterministic finite automata (NFAs), which can be relatively easy to construct and often provide relative flexibility, and deterministic finite automata (DFAs), which provide predictability and can support high performance processing.

Unlike DFAs, in NFAs an input to a state may result in a transition to more than one state. In general, NFAs may be converted into DFAs using a powerset construction, or subset construction, algorithm. DFAs may be more efficiently executed than equivalent NFAs, since each state transition in a DFA requires an input and results in a single state. However, DFAs also potentially may have an exponentially higher number of states, as compared to equivalent NFAs.

As a result, systems that deal with large sets of regular expressions typically may face state explosion, a scenario in which translation of a regular expression results in a DFA with an exponentially larger number of states than the corresponding NFA. State growth resulting from one or a few regular expressions often may be manageable, but as the size of a regular expression increases, and as more regular expressions are combined, the state explosion problem becomes increasingly relevant and can become unmanageable for most systems. This problem is acute for large sets of regular expressions, for example, numbering in the thousands. Thus, execution of the DFAs often presents a performance bottleneck.

Typically, at runtime each DFA may be executed by one of a relatively small number of execution engines. Each of the execution engines in parallel takes a character from and input stream and performs a state transition depending on the current state and the input character. Extended DFA engines often offer limited local memory for variables and arithmetic operations to augment the pure state-transition semantics. For example, variables may be used to implement a more efficient counter than a pure state machine is able to implement. Such extensions may be helpful, for example, in implementing regular expressions that include bounded repetitions.

Hardware-based, relatively high-performance systems are available to compile regular expressions into equivalent DFAs. Solutions for distributing regular expressions among DFA engines are available in which the fundamental problem of state explosion is simply ignored, for applications in which the set of regular expressions is sufficiently small. Solution are available that implement NFAs instead of DFAs, or implement hybrid systems that combine the use of NFAs and DFAs. However, the use of NFAs cannot always provide the required level of deterministic high-speed performance, making the scalability and performance of such systems uncertain.

Other solutions are available that implement only a single DFA engine, but in this case all of the regular expressions must be processed by the same engine. Heuristics-based approaches are available to determine utilization extended resources, but the heuristics do not typically take into account multiple recognition engines. In addition, "brute-force," or extensive simulation, approaches are available, but these generally do not scale to large numbers of regular expressions.

SUMMARY

According to one embodiment of the present invention, a method for distributing sets of regular expressions to a fixed number of state machine engines includes combining, with a processing device, a plurality of regular expressions into a single compound regular expression, creating a single nondeterministic finite automaton (NFA) including a plurality of NFA states based on the compound regular expression, performing an interference analysis for each pair of NFA states to identify all pairs of NFA states that would potentially interfere in an equivalent deterministic finite automaton (DFA), creating an interference graph representing the regular expressions related to all potentially interfering NFA states based on the results of the interference analysis, and performing a graph coloring algorithm on the interference graph to assign a different color to each represented regular expression in the graph.

According to another embodiment of the present invention, a system for distributing sets of regular expressions to a fixed number of state machine engines includes an NFA compiler configure to combine a plurality of regular expressions into a single compound regular expression and create a single nondeterministic finite automaton (NFA) including a plurality of NFA states based on the compound regular expression, an interference analyzer configured to perform an interference analysis for each pair of NFA states to identify all pairs of NFA states that would potentially interfere in an equivalent deterministic finite automaton (DFA), a graph generator configured to create an interference graph representing the regular expressions associated with potentially interfering NFA states based on the results of the interference analysis, and a coloring tool configured to perform an optimized graph coloring algorithm on the interference graph to assign a different color to each represented regular expression in the graph.

According to yet another embodiment of the present invention, a computer program product for distributing sets of regular expressions to a fixed number of state machine engines includes a computer readable storage medium having program code embodied therewith, the program code executable by a computer to implement combining a plurality of regular expressions into a single compound regular expression, creating a single nondeterministic finite automaton (NFA) including a plurality of NFA states based on the compound regular expression, performing an interference analysis for each pair of NFA states to identify all pairs of NFA states that would potentially interfere in an equivalent deterministic finite automaton (DFA), creating an interference graph representing the regular expressions related to potentially interfering NFA states based on the results of the interference analysis, and performing an heuristic graph coloring algorithm on the interference graph to assign a different color to each represented regular expression in the graph.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Given the potential of state explosion, it is important that a system with a fixed number of state machines, including extended deterministic finite automaton (DFA) engines, that handle large sets of regular expressions distribute the regular expressions to the engines in a manner that takes into consideration the overall number of DFA states that may result and, if state explosion cannot be avoided by considered distribution of the regular expressions, also makes efficient use of the available extended capabilities of the engines. An embodiment of the present invention may provide a method for distributing large sets of regular expressions to a fixed number of state machine engines in a manner that may avoid state explosion and efficiently utilize extended capabilities of the engines.

An embodiment of the invention may analyze a set of regular expressions to identify potential interference between states on a per-state basis, and use the resulting interference information to distribute the regular expressions among the engines. For example, an embodiment may identify interference pairs, that is, pairs of states that may coexist in an equivalent nondeterministic finite automaton (NFA) that may cause state growth or state explosion. In addition, an embodiment may determine how to most efficiently make use of the DFA extensions, if needed.

Contemporary methods typically attempt solve the distribution problem—deciding which regular expressions to assign to which engines—separately from the question of heuristically deciding with regard to the individual regular expressions which portions, such as, for example, a bounded repetition of a large character class, are to be handled by engine extensions implementing variables stored in registers. In contrast, an embodiment of the present invention simultaneously determines both issues, employing extensions only when necessary in order to avoid state explosion in the distribution process.

A regular expression distributor in accordance with an embodiment may combine all regular expressions into a single compound NFA and efficiently analyze the NFA to identify interference pairs, that is, pairs of states that may coexist in the NFA and may transition from a common state, and thus potentially may cause excessive state growth or state explosion. The regular expression distributor may further create an interference graph based on the resulting interference pairs, for example, with nodes representing the regular expressions and edges indicating the presence of potentially interfering states. The regular expression distributor may implement a graph-coloring algorithm to assign regular expressions to the execution engines, for example, using a different color for each engine.

If necessary to complete the graph-coloring algorithm, the regular expression distributor may intermittently select a particular node from the interference graph and apply the interference information to decide how to proceed. For example, the regular expression distributor may decide to accept the state growth that may be caused by the regular expression, and assign a color, or engine to the node, or regular expression. In this case, the regular expression distributor may remove the node from the graph. Otherwise, the regular expression distributor may decide to split the underlying regular expression in order to separate the interfering NFA states, and assign the regular expression to an extended DFA. In this case, the interfering states and corresponding edges are removed from the interference graph. The regular expression distributor may then continue coloring the remaining graph. This process may be repeated as necessary until the graph-coloring algorithm is successfully completed.

Figure 1:
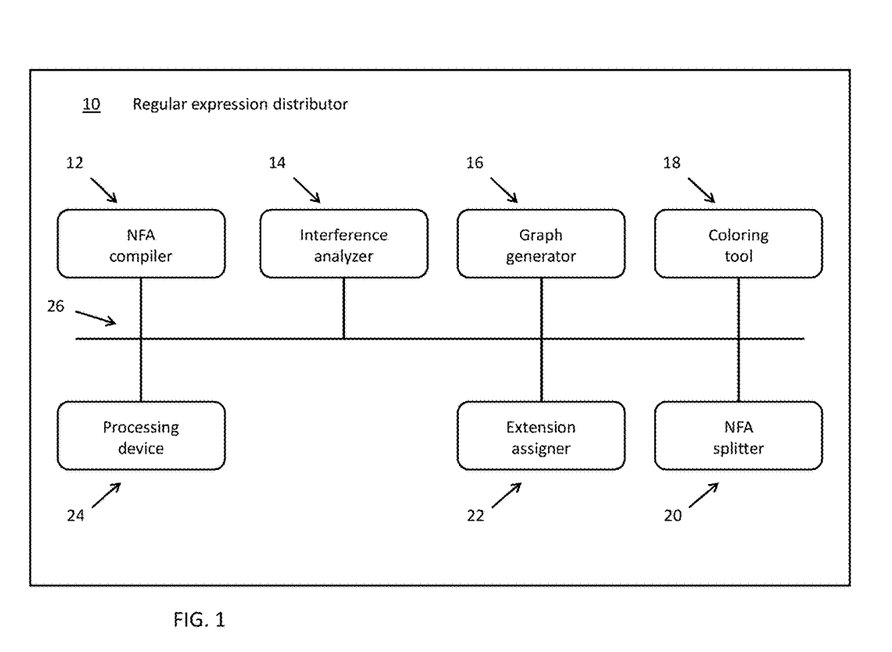
FIG. 1 is a schematic diagram of a regular expression distributor in accordance with an embodiment of the invention.

Referring now to FIG. 1, a regular expression distributor 10 in accordance with the present invention may include an NFA compiler 12, an interference analyzer 14, a graph generator 16, a graph coloring tool 18, a NFA splitter 20, an extension assigner 22, and a processing device 24, all of which may be communicatively connected by data links 26.

In preparation for state interference analysis, the NFA compiler 12 may be configured to combine a given set of regular expressions into single compound NFA. For example, the set of regular expressions including $r_1, r_2, \ldots, r_n$ may be combined implementing alternation to construct the combined expression, $r_1 | r_2 | \ldots | r_n$. Generally, the regular expressions represent unanchored patterns, in which case the combined expression may include a root node indicating no characters (the "empty" string, ε), any character or any character string, as commonly represented in regular expression notation, or metacharacters, ".*". Otherwise, the NFA compiler 12 may include an appropriate root node in accordance with the defined regular expressions.

Figure 2:
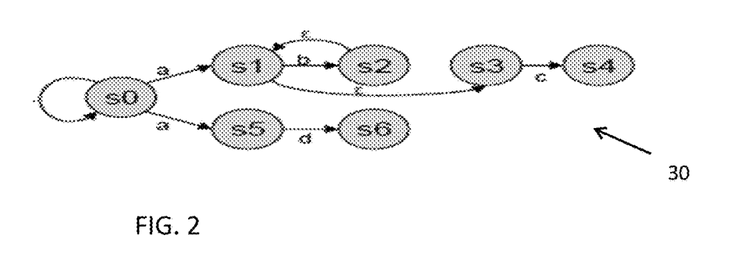
FIG. 2 illustrates an exemplary state diagram in accordance with an embodiment of the invention.

In an embodiment, the NFA compiler 12 may create an NFA as a traditional state transition diagram including input character labels associated with each transition arrow, or edge. For example, FIG. 2 illustrates an exemplary state transition diagram 30 representing a combination of the two regular expressions, $r_1 = ab^*c$ and $r_2 = ad$, or $.*(r_1 | r_2)$, with input character labels along the transitions.

In an alternative embodiment, the NFA compiler 12 may create the compound NFA instead as a modified state transition diagram including input character labels on the states.

Figure 3:
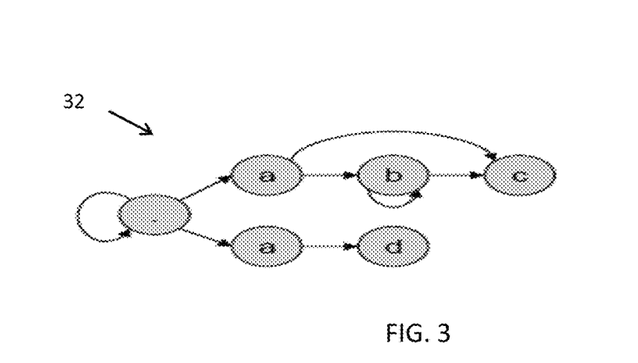
FIG. 3 illustrates an exemplary state diagram in accordance with an embodiment of the invention.

For example, FIG. 3 illustrates an exemplary state transition diagram 32 representing the combination of the same two regular expressions, $r_1$=ab*c and $r_2$=ad, or .*($r_1$|$r_2$), with an input character label on each state. Although there is no fundamental difference in the meaning conveyed by each of the two state transition diagrams 30, 32, of FIGS. 2 and 3, the approach of the state transition diagram 32 of FIG. 3 may simplify the associated algorithm relative to that of state transition diagram 30 of FIG. 2.

The interference analyzer 14 may be configured to a state interference analysis on the combined NFA on a per-state basis. The interference analyzer 14 may identify NFA states that may cause state growth or state explosion when compiled into an equivalent DFA.

The formal foundation of the interference analysis presumes that the conversion from an NFA into an equivalent DFA may potentially suffer from excessive state space growth, or state explosion, if and only if there are interfering pairs of states that may be simultaneously active in the NFA such that there exist corresponding states in the DFA where the pair of states occur together in a DFA state, and each of the pair of NFA states also occurs without the other in separate DFA states. That is to say, state explosion may occur according to the following definition with respect to NFA states s and t, and DFA states U, V, and W, where each state in D represents a distinct active set in the NFA (states that can be active at the same time in the NFA):

Potential for state explosion exists IFF:
s interferes with t ⇔ ∃U, V, W∈D such that:
1) s∈U and t∈U (s occurs with t in some DFA state U),
2) s∈V and t∉V (s occurs without t in some DFA state V), and
3) s∉W and t∈W (t occurs without s in some DFA state W).

Generally, it is not necessary to create the DFA in order to perform the interference analysis. Instead, the analysis may be performed "locally" with regard to the NFA starting from pairs of states that may occur together in the compound NFA. Pairs of states that may simultaneously occur in the NFA may be identified in an initial co-occurrence analysis, ("'With'-Analysis," or "w/-analysis"), followed by an independence analysis ("'Without'-Analysis," or "w/o-analysis") to verify whether or not each of the pair of states may occur without the other in the NFA.

The following pseudocode algorithm is provided as an exemplary method for performing the interference analysis:

```
Input: N (NFA)
Output: Pairs of states in N that may interfere
Begin:
result = { }
pairs = w/-analysis(N)
for each (s, t) in pairs:
    if w/o-analysis(s, t)
        and w/o-analysis(t, s) then
        add (s, t) to result
```

Thus, the interference analyzer 14 may be configured to perform a co-occurrence analysis with regard to each pair of states in the NFA ("With"-analysis). For example, the interference analyzer 14 may analyze each pair of states in the NFA to determine if an input to any state may result in a transition to both constituent states being analyzed, or if an input to any two states may result in simultaneous transitions to both constituent states being analyzed, or if an input to any state may result in a transition to one of the states being analyzed while the other state being analyzed already exists and does not transition, such that the pair of NFA states may be active at the same time.

The interference analyzer 14 may further analyze whether or not a common input to each of the pair of states in the NFA may result in simultaneous transitions from the pair of states being analyzed to two additional states. If so, and the pair of states may be active at the same time, then the interference analyzer 14 may deduce that there must be at least one active set that includes the two additional states, as well, given that the powerset construction follows all possible paths. That is to say, if s→u and t→v are transitions in the NFA that include a common input [input(u)∩input(v) ≠∅], and s may occur with t in some active set in the NFA, then the interference analyzer 14 may deduce that there also must exist at least one active set that contains u and v.

The following pseudocode algorithm is provided as an exemplary method for performing the co-occurrence analysis (w/-analysis) [$O(n^2/2)$]:

```
Input: N (NFA)
Output: Pairs of states in N that occur together
Begin:
create bool table of size |N| (triangular)
worklist = [ ]
for all s in N:
    add (root(N),s) to worklist
while worklist is not empty:
    take (s, t) from worklist //canonical ordering
        of s and t
    if (s, t) marked in with-table then
        continue while loop
    mark (s, t) in with-table
    for each u = outgoing(s):
        for each v = outgoing(t):
            if input(u) intersects input(v) then
                add pair (u, v) to worklist
```

For each pair of states identified in the NFA that meets the first condition, that is, the w/-analysis, the interference analyzer 14 may be configured to perform an independence analysis to determine if each of the pair of states may occur in an active set in the NFA without the other ("Without"-analysis). For example, in order to derive a precise solution, the interference analyzer 14 may analyze each identified pair for language inclusion in accordance with language theory.

Thus, the interference analyzer 14 may test whether the relative complement of the language associated with the first of the two constituent states in the pair is includes at least one input, or that at least one input exists that may cause a transition from a state in the NFA to the first state of the pair but cannot cause a transition from any state in the NFA to the second state of the pair, according to the following definition:

$$s \text{ w/o } t ::= L(s)/L(t) \neq \emptyset$$

However, finding the precise solution in this manner generally is not practical, because the problem is PSPACE complete and cannot be scaled for use with large sets of regular expressions. As a result, in practical applications the interference analyzer 14 may instead perform an imprecise approximation for the "Without"-analysis. In an embodiment, the interference analyzer 14 may perform an approximation that temporarily stores intermediate results in memory during the analysis and implements a backstepping procedure.

For example, the interference analyzer 14 may verify whether or not the set of inputs for the first state of the pair is a strict superset of all possible inputs for the second state of the pair in the NFA, that is, whether or not the input set for the first state includes all the inputs for the second state plus at least one additional input, in which case the w/o-analysis regarding the first state of the pairing of states with respect to the second state (primary w/o-analysis) passes, or the result of the of the analysis is true.

Otherwise, the interference analyzer 14 may check whether the second state of the pair is the root of the regular expression, in which case the w/o-analysis regarding the first state of the pairing of states with respect to the second state fails, or the result of the of the analysis is false. Otherwise, if the second state of the pair is not the root of the regular expression, the interference analyzer 14 may check whether the first state of the pair is the root of the regular expression, in which case the w/o-analysis regarding the first state of the pairing of states with respect to the second state passes, or the result of the of the analysis is true. Otherwise, the interference analyzer 14 may recursively verify whether or not there is an input character that may cause a transition from a state in the NFA to the first constituent state but cannot cause a transition from any state in the NFA to the second constituent state, in which case the w/o-analysis regarding the first state of the pairing of states with respect to the second state passes, or the result of the of the analysis is true.

If the w/o-analysis regarding the first state of the pairing of states with respect to the second state passes, then the interference analyzer 14 may likewise perform an imprecise approximation for the "Without"-analysis regarding the second state of the pairing of states with respect to the first state (secondary w/o-analysis). A person of ordinary skill in the art will recognize that the order in which the w/o-analyses are performed is not important. That is, in an alternative embodiment, the w/o-analysis may be initially be performed regarding the second state of the pairing of states with respect to the first state, an if it passes, then the secondary w/o-analysis may be performed regarding the first state of the pairing of states with respect to the second state.

The following pseudocode algorithm is provided as an exemplary method for performing the independence analysis (w/o-analysis) [$O(n^2)$]:

```
s w/o t ::=
    if input(s) ⊃ input(t) then
        true
    else if t is root then false
    else if s is root then true
    else ∃ u → s : ∀ v → t: u w/o v
```

In an alternative embodiment, the interference analyzer 14 may perform an alternative imprecise approximation for the "Without"-analysis. For example, the interference analyzer 14 may implement the above approximation analysis regarding the first state of the pairing of states with respect to a set of states of which the second state of the pairing is an element.

If the alternative imprecise approximation for the w/out-analysis regarding the first state of the pairing of states with respect to the set of states passes, then the interference analyzer 14 may likewise perform an alternative imprecise approximation for the w/out-analysis regarding the second state of the pairing of states with respect to a set of states of which the first state of the pairing is an element.

The following pseudocode algorithm is provided as an alternative exemplary method for performing the independence analysis (w/o-analysis) [O]:

```
s w/o {T} ::=
    if input (s) ⊃ U_{t∈T} input (t) then
        true
    else if root ∈ T then false
    else if s is root then true
    else ∃ u → s : u w/o {v | U_{t∈T} v → t }
```

A person of ordinary skill in the art will understand that the use of an efficient approximation, such as those described above, may over-approximate or under-approximate the w/o-relation between the pair of states. Thus, the quality of such an approximation in practice must be evaluated for real-world input.

Figure 4:
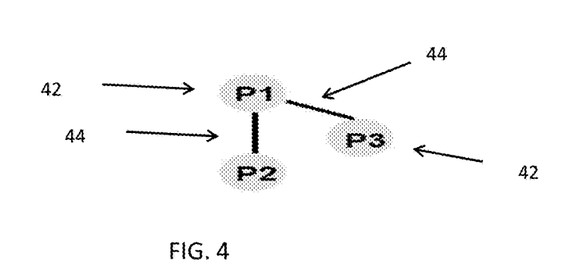
FIG. 4 illustrates an exemplary interference graph in accordance with an embodiment of the invention.

The graph generator 16 may create an interference graph that graphically represents potential interference between NFA states associated with the regular expressions. For example, the graph generator 16 may represent regular expressions as nodes, pairs of which may be connected by edges in the interference graph if at least one pair of potentially interfering states is associated with the regular expressions. Thus, each potentially interfering node appears only once in the graph. Each node is connected to all other nodes with which that node potentially interferes. FIG. 4 illustrates an exemplary interference graph 40 with nodes 42 representing regular expressions and edges 44 representing potential interferences.

The following pseudocode algorithm is provided as an exemplary method for creating an interference graph:

```
Input: R (Regular expressions), P (pairs of
interfering states)
Output: Interference graph G
Begin:
G = new Graph
for each r in R:
    add node(r) to G
for each (s, t) in P:
    a = node in G representing regular expression
        of s
    b = node in G representing regular expression
        of t //s==t possible
    if a → b does not yet exist in G then
        add a → b to G
```

Figure 5:
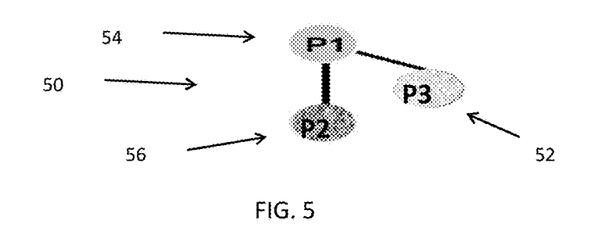
FIG. 5 illustrates an exemplary interference graph with colored nodes in accordance with an embodiment of the invention.

The graph coloring tool 18 may assign a color to each node in the interference graph, and color the nodes accordingly. For example, the graph coloring tool 18 may implement a graph coloring algorithm similar to those applied by some compilers that create a register interference graph for register allocation. The color may represent a particular state machine engine that will be assigned to execute the corresponding regular expression. FIG. 5 illustrates an exemplary interference graph 50 with a different color assigned to each node 52, 54, 56. In an embodiment, the number of colors may equal the number of state machine engines.

In an embodiment, the graph coloring algorithm may utilize heuristics to compute a coloring scheme for the interference graph. For example, the graph coloring tool 18 may select a node with fewer edges, or connections to neighboring nodes, than the total number of available colors, or engines, if such a node exists. The graph coloring tool 18 may remove the node, along with all of the edges connected to the node, from the interference graph and place the node on a stack data structure. The graph coloring tool 18 may continue consecutively selecting additional nodes that have fewer remaining edges than the total number of colors and remove each such node from the graph.

Otherwise, if the graph is not colorable, that is, if there is not a node in the graph with fewer edges than the total number of colors, then the graph coloring tool 18 may select a node with more edges than the number of available colors and either split the node or mark the node as fixed. For example, in an embodiment, the graph coloring tool 18 may select the node in the graph with the highest number of edges, or degree.

If DFA extension resources are available, the NFA splitter 20 may identify the states in the corresponding regular expression that may cause interference and separate those states, splitting the regular expression into multiple component regular expressions. The extension assigner 22 may insert, or assign, appropriate extension operations required to implement the original functionality of the full regular expression. The NFA splitter 20 may request that the interference analyzer 14 run "With"-analysis and "Without"-analysis regarding each of the component regular expressions, and then allow the graph coloring tool 18 to resume. Otherwise, if extension resources are not available, the graph coloring tool 18 may mark the node as fixed and restart coloring.

The following pseudocode algorithm is provided as an exemplary method for coloring an interference graph (assigning regular expressions engines):

```
Input: G (Interference graph), P (Interfering
pairs), c (number of colors/engines)
Output: Assignment of nodes in G (= regular
expressions) to colors (= engines)
Begin:
stack = [ ]
while G has nodes:
    if ∃ node n ∈ G with degree(n) <= c then
        push n onto stack; remove n (and n's edges)
        from G
    else
        pick a node n (e.g., with highest degree)
        split n or mark n as fixed and restart
    pop nodes from stack and assign a free color or
    pick color for "fixed" nodes
```

The processing device 24 may include any computer processing device capable of supporting appropriate data analysis. For example, in any embodiment, the processing device 24 may be implemented using a mainframe computer, a server, a desktop personal computer, a laptop computer, a notebook computer, a tablet computing device, a mobile computing device, or any other suitable computer processing device. In any embodiment, the processing device 24 may further include one or more memory devices, including but not limited to read-only memory (ROM), random access memory (RAM), or a cache memory; one or more input/output (I/O) devices, including but not limited to a monitor, a keyboard, or a pointing device; one or more storage devices, including but not limited to a hard disk drive (HDD), a compact disk (CD) drive, an integral or removable solid-state memory device (SSD); a network connection interface; as well as other integral, peripheral or accessory computer components as are known in the art.

The analog or digital data links 26 may include any connective medium capable of transmitting analog or digital data, as the specific application may require. For example, in any embodiment, the data links 26 may be implemented using any type of combination of known communications connections, including but not limited to digital data buses, a universal serial bus (USB), an Ethernet bus or cable, a wireless access point, twisted pairs of wires, or the like. In any embodiment, any portion or all of the data links 26 may be implemented using physical connections, radio frequency or wireless technology. A person of ordinary skill in the art will readily apprehend that any combination of numerous existing or future data communication technologies may be implemented in association with an embodiment of the invention.

Figure 6:
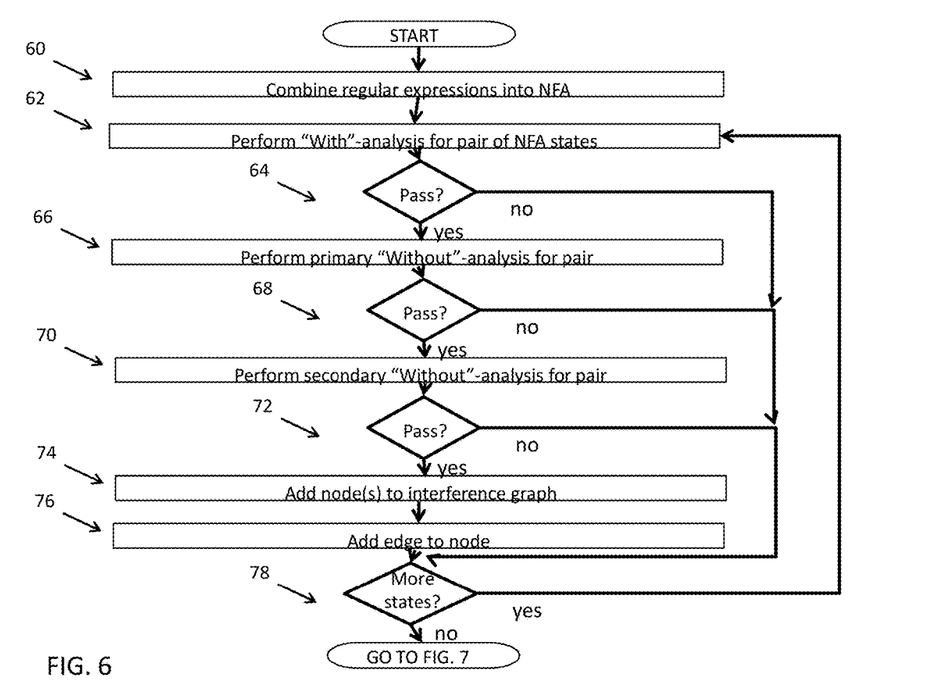
FIG. 6 is a flow diagram of a method in accordance with an embodiment of the invention.

Referring to FIG. 6, a method in accordance with an embodiment of the present invention is shown. In block 60, a set of regular expressions may be combined into a single NFA. For example, a large set including more than a thousand regular expressions may be combined into an NFA. In block 62, a co-occurrence analysis ("'With'-Analysis," or "w/-analysis") may be performed with regard to a pair of states that may occur together in the NFA to verify whether or not each of the pair of states may occur without the other in the NFA, as described above with reference to the interference analyzer 14 of FIG. 3.

If the pair of states passes the w/-analysis, in block 64, then a primary independence analysis ("'Without'-Analysis," or "w/o-analysis") may be performed, in block 66, to determine if the pair of states may occur in an active set in the NFA without the other. For example, an imprecise approximation for the w/o-analysis may be performed as described above with reference to the interference analyzer 14 of FIG. 3. If the primary w/o-analysis for the pair of states passes, in block 68, then a secondary w/o-analysis may be performed for the pair of states, in block 70, as described above with reference to the interference analyzer 14 of FIG. 3.

If the pair of states passes the secondary w/o-analysis, in block 72, an interference graph for the NFA may be created, if one has not yet been created, in block 74, and nodes representing the states may be added to an interference graph, as explained above with reference to the graph generator 16 of FIG. 3. In some cases, one or both of the states will already be represented in the graph, in which case a node for the remaining state may be added to the interference graph, or no nodes may be added. In block 76, an edge may be added between the two corresponding nodes in the graph to represent the potential interference between the pair of states.

If additional pairs of states remain to be analyzed, in block 78, then the actions in blocks 62-76 may be repeated until all states have been analyzed and nodes have been added to the interference graph for all potentially interfering states. Once all pairs of states in the NFA have been analyzed, and added to the interference graph, if required, the method may continue in FIG. 7.

Figure 7:
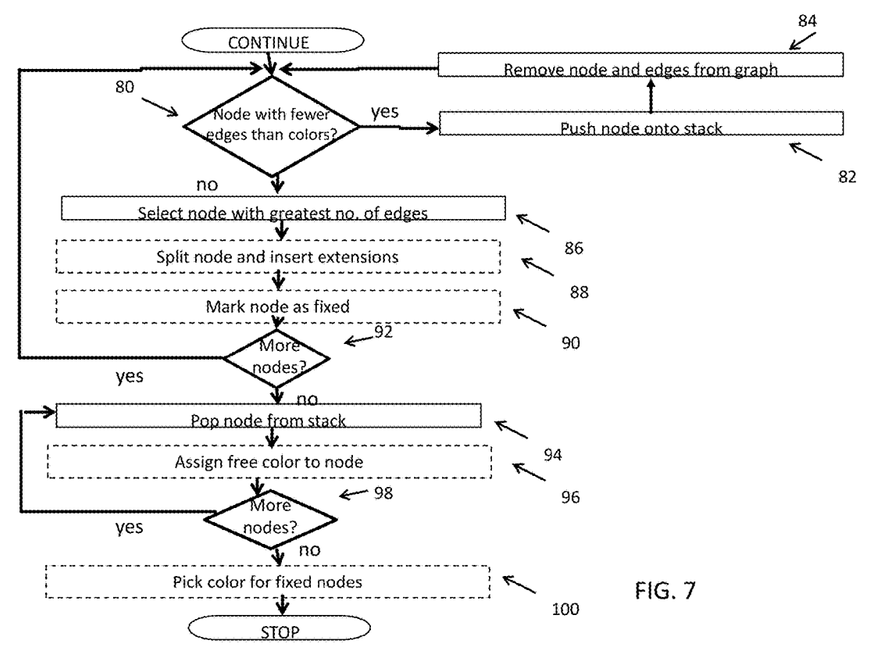
FIG. 7 is a flow diagram of a method in accordance with an embodiment of the invention.

In block 80, if available, a node with fewer edges, or potential interferences, than the total number of available state machine engines may be selected. If such a node exists, the node may be pushed onto the stack, in block 82, and the node and corresponding edges may be removed from the interference graph, in block 84, as described above with reference to the graph coloring tool 18 of FIG. 3. The method may return to block 80 and continue.

If no such node is available, in block 80, then the node with the greatest number of remaining edge connections may be selected, in block 86. In block 88, the selected node may optionally be split and any required DFA extensions inserted, as described above with reference to the NFA splitter 20 and the extension assigner 22 of FIG. 3. Otherwise, if no extensions are available, the node may be marked as fixed, in block 90. If additional nodes remain in the graph, in block 92, the method may return to block 80 and continue.

Once all the nodes in the interference graph have been pushed onto the stack or marked as fixed, in block 92, then a node may be popped from the top of the stack and returned to the interference graph, in block 94. An available color, that has not yet been assigned to any node, may be assigned to the node, in block 96, as explained above with reference to the graph coloring tool 18 of FIG. 3. If additional nodes remain on the stack, in block 98, then the method may return to block 94 and continue.

Otherwise, when all nodes have been removed from the stack, assigned a color and reinserted into the interference graph, in block 98, then a color may be selected for each of the remaining nodes marked as fixed, in block 100.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for preventing state explosion by distributing sets of regular expressions to a fixed number of state machine engines, the computer program product comprising:

a non-transitory computer readable storage medium having program code embodied therewith, the program code executable by the computer to perform a method comprising:

combining a plurality of regular expressions into a single compound regular expression;

creating a single nondeterministic finite automaton (NFA) including a plurality of NFA states based on the compound regular expression;

performing an interference analysis for each pair of NFA states to identify all pairs of NFA states that would potentially interfere in an equivalent deterministic finite automaton (DFA) performing the interference analysis further comprising:

performing a co-occurrence analysis for each pair of NFA states to determine whether the two constituent states can simultaneously be active in the NFA, performing the co-occurrence analysis further comprising determining whether the input to any one of the NFA states while a first of the two constituent states is active may result in a second transition from the one of the NFA states to a second of the two constituent states while the first of the two constituent states remains active; and performing an independence analysis for each pair of NFA states having a positive result in the co-occurrence analysis to determine whether each of the two constituent states can be active in the NFA while the other is not active, wherein all pairs of NFA states having a positive result in the independence analysis are deemed to potentially interfere in the equivalent DFA;

creating an interference graph representing all regular expressions associated with potentially interfering NFA states based on the results of the interference analysis;

performing a graph coloring algorithm on the interference graph to assign a color to each represented regular expression in the graph;

representing each regular expression associated with a potentially interfering NFA state by a node in the interference graph;

connecting each pair of regular expressions associated with potentially interfering states by an edge, wherein each color corresponds to a particular DFA engine available to execute at least a portion of the equivalent DFA;

wherein when there is not a node in the interference graph with fewer edges than a total number of colors, causing the graph coloring algorithm is configured to:

select a first node having the greatest number of edge connections in the interference graph, split the first node into two or more constituent nodes, each of which has fewer edge connections than the total number of available colors, the split of the first node being a split of an underlying regular expression, and then assign a DFA extension to at least one of the constituent nodes in order to maintain the original NFA functionality; and based on there being no DFA extension available to assign for the first node, mark the first node as fixed and then restart coloring;

wherein when there are nodes in the interference graph with fewer edges than the total number of colors, the graph coloring algorithm is configured to remove the nodes having fewer edges than the total number of colors from the interference graph;

assigning regular expressions of a particular color to a particular DFA engine corresponding to the particular color; and executing regular expressions by corresponding DFA engines on streams of input characters.

2. The computer program product of claim 1, further comprising: assigning a free color to the first node having been marked as fixed.

3. The computer program product of claim 1, wherein performing a graph coloring algorithm further comprises:

sequentially pushing onto a stack nodes from the interference graph that are connected to fewer edges than the total number of available colors;

removing each node and the edges connected to the node from the interference graph in response to that node having been pushed onto the stack;

sequentially popping nodes from the stack in response to all nodes having been removed from the interference graph;

and assigning a free color to each node in response to that node having been popped from the stack.

4. The computer program product of claim 1, wherein performing the independence analysis further comprises recursively determining whether an input to any one of the NFA states results in a first transition from the one of the NFA states to a first of the two constituent states but does not result in a second transition from any one of the NFA states to a second of the two constituent states.

\* \* \* \* \*